United States Patent [19]

Bottomley et al.

[11] Patent Number: 4,888,184

[45] Date of Patent: Dec. 19, 1989

[54] DECOLORISING OF WHEY AND PRODUCTS DERIVED FROM WHEY

[75] Inventors: Robin C. Bottomley, Bucks; Robert D. Colvin, South Harrow, both of England; Madison Van Blanton, Louisville, Ky.

[73] Assignee: Express Foods Group Limited, Middlesex, England

[21] Appl. No.: 27,909

[22] Filed: Mar. 19, 1987

[51] Int. Cl.$^4$ .................. A23C 21/02; A23C 21/08; A23L 1/015
[52] U.S. Cl. .................................. 426/41; 426/253; 426/258; 426/268; 426/583; 426/491; 426/495
[58] Field of Search ............... 426/41, 253, 254, 257, 426/258, 262, 268, 583, 491, 495

[56] References Cited

U.S. PATENT DOCUMENTS 1,687,805  10/1928  Stoddard et al. .................. 426/258

FOREIGN PATENT DOCUMENTS 0118534  10/1978  Japan .................................. 426/258
0973099  11/1982  U.S.S.R. ............................. 426/583

Primary Examiner—Marianne Cintins
Attorney, Agent, or Firm—Beveridge, DeGrandi & Weilacher

[57] ABSTRACT

The invention provides a process of decolorising annatto-containing whey or products produced therefrom, by oxidation with hydrogen peroxide, characterised in that the oxidation is carried out in the presence of a catalytic amount of an active peroxidase, in that the amount of hydrogen peroxide used is sufficient to effect the oxidation of the annatto and in that the time for which the peroxidase is exposed to a deactivating concentration of hydrogen peroxide is insufficient to permanently deactivate the peroxidase. The process is generally applicable to inter alia whey, demineralised whey, reconstituted whey powders, whey protein concentrates and reconstituted whey protein concentrate powders. It may be applied as a batch, semicontinuous or a continuous in line process.

22 Claims, 14 Drawing Sheets

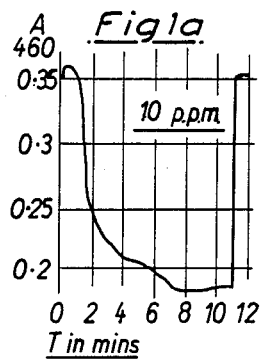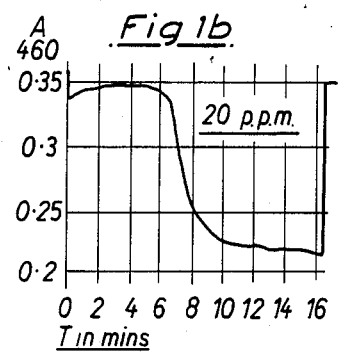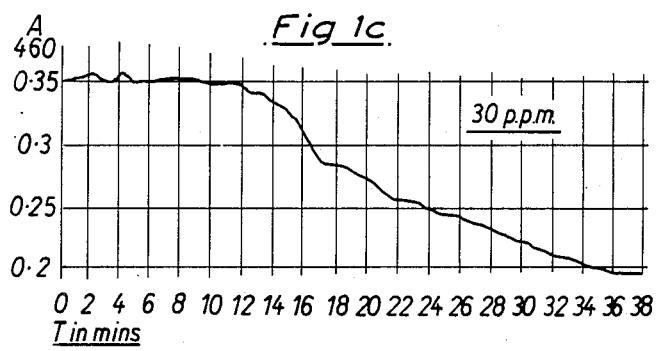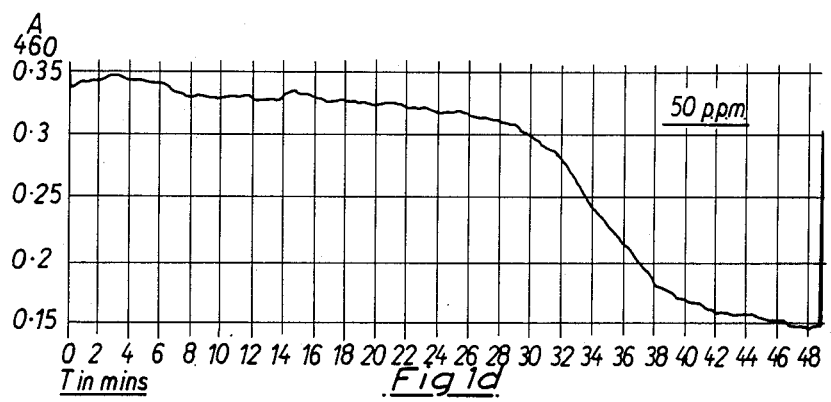

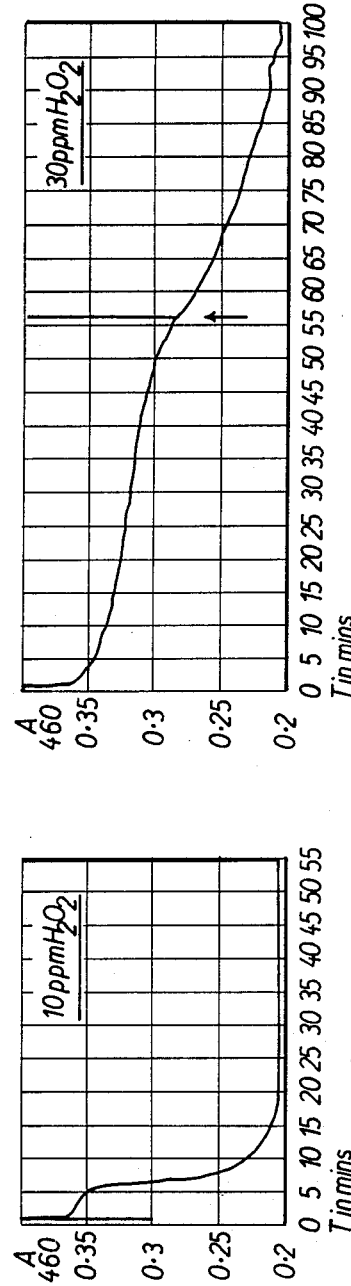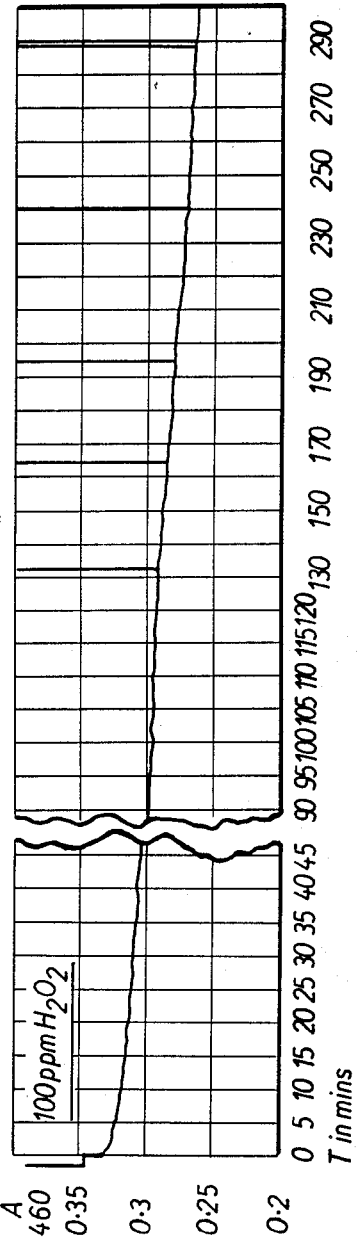
Fig 2a.
Fig 2b.
Fig 2c.

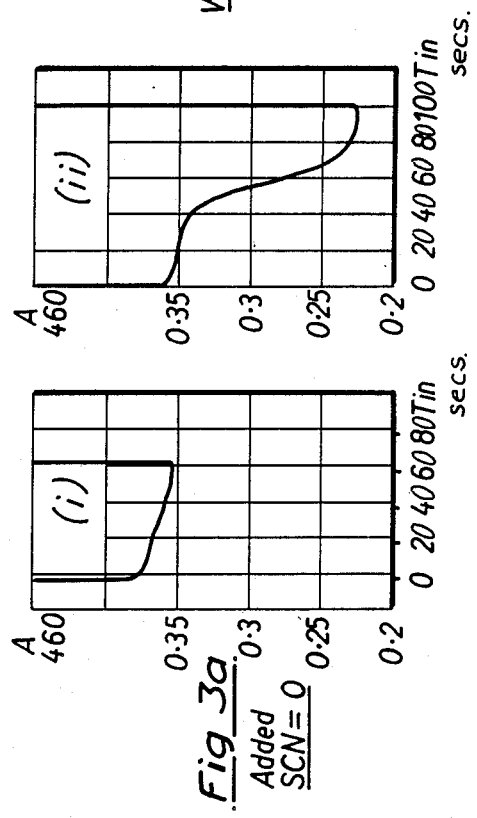
Fig 3a. Added SCN = 0 WHEY CONTROL

SCN = 1 ppm

SCN = 2 ppm

SCN = 4 ppm

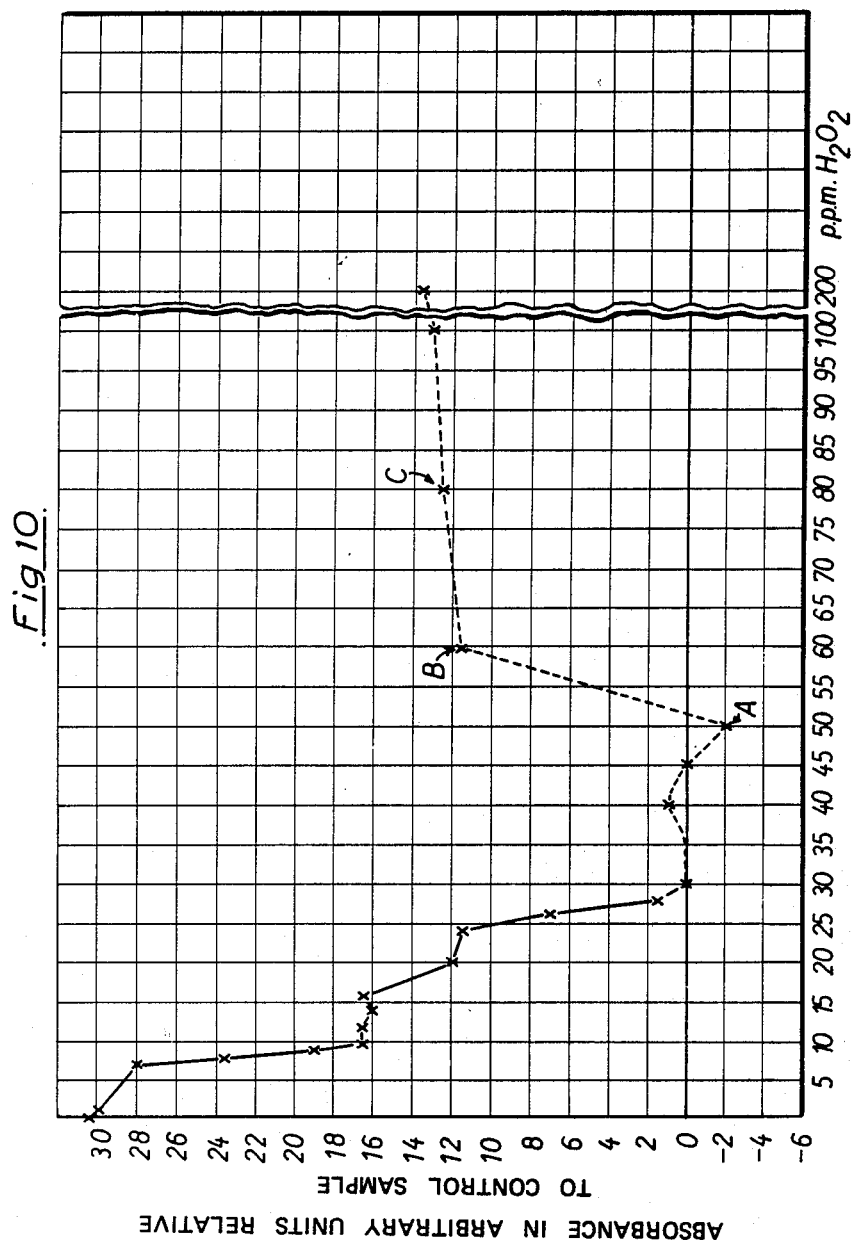

DECOLORISING OF WHEY AND PRODUCTS DERIVED FROM WHEY

DESCRIPTION

The present invention relates to the decolourising of whey and products derived from whey such as demineralised whey and whey protein concentrates.

The most commonly used material for dyeing cheese is annatto, a natural colouring material derived from the fruit *bixo orellena*. The presence of annatto, whilst desirable in the cheese is undesirable in products produced by further processing such as demineralization or concentration as by ultrafiltration techniques. Thus the use of annatto in cheese produces a coloured whey so that protein concentrates produced from such whey will also be coloured. This colourisation renders such secondary products less valuable than secondary products produced from uncoloured starting materials and not infrequently renders them unusable for some applications.

The decolourisation of coloured whey and secondary whey products is thus very desirable. Thus whey and secondary products such as whey protein concentrates (WPC) which contain annatto must be decolourised if they are to have a value approaching that of uncoloured whey and secondary products produced therefrom. This problem is a longstanding one in the art.

Studies of the destruction of the much less stable compound $\beta$-carotene in peroxidase/hydrogen peroxide/halide systems have been reported in Lipids Vol. 18, No. 3 (1983) at page 198 in connection with the study of the oxidation of lipids in foods. Since carotene is not normally soluble in aqueous systems substantial quantities of the surfactant Tween 80 were used to bring the carotene into aqueous solution. The destruction of $\beta$-carotene was used as a sensitive method to determine the activity of the enzyme. In the said aqueous system, in the presence of optimal concentration of hydrogen peroxide the rate of $\beta$-carotene destruction was reported as slowly increasing until a critical concentration of the halides was reached, followed by a rapid increase in the rate when the halide concentration was further increased.

This system was further studied by Ekstrand and Bjorck and reported in J. Agric. Food Chem. 1986, 34, 412–415. Such studies of artificially produced aqueous systems containing substantial quantities of Tween 80 however, have not provided any basis for the creation of a viable process for decolourising the much more stable annatto in whey, even on a laboratory scale and still less on a commercial scale.

The only method which has been suggested as a decolourising process for whey is that proposed by McDonough et al. in J. Dairy Science Vol. 51, No. 3 pages 471 and 472 to decolourise annatto-containing Cheddar-cheese whey before drying by oxidation with benzoyl peroxide or hydrogen peroxide. The paper by McDonough et al states that the efficiency of decolourisation was determined by measuring the transmittance of light by clarified whey with a Bausch and Lomb Model 340 Spectrophotometer at a wavelength of 600 m$\mu$ or in modern terms 600 nm. Uncoloured whey and unbleached coloured whey were used as controls.

As described in more detail hereinafter with reference to the accompanying drawings, annatto has a maximum absorbance in whey at 460 nm and has virtually no absorbance at a wavelength of 600 nm. It is impossible to determine therefore what relationship, if any, the transmission figures for clarified whey reported by McDonough et al. have to the decolourisation of annatto by hydrogen peroxide. Nothing is said in the paper about the actual colour of the 'decolourised whey powders' mentioned in the paper as having been made by concentration in an evaporator under vacuum and freeze drying. The paper also reports that catalase was added to the $H_2O_2$ containing lots to inactivate residual $H_2O_2$ indicating that even after 2 hours residual $H_2O_2$ remained in the whey. The whey used by McDonough et al. was produced during laboratory or pilot scale Cheddar cheese making and was pasteurized before use.

In attempting to apply the teaching of McDonough et al. to the decolourisation of commercially produced annatto coloured whey it has been found that using 300 and 500 ppm of $H_2O_2$, in the concentrations recommended by McDonough et al. little decolourisation is achieved with fresh pasteurized whey. It has also been found that even at a starting concentration of 100 ppm $H_2O_2$ fresh whey still contained residual $H_2O_2$ even after 4 hours, and little decolourisation had taken place.

McDonough et al. reported that the decolourising effectiveness of hydrogen peroxide on annatto was reduced as the amount of curd particles in the whey increased and gave as the probable reason the inactivating effect of the natural peroxidases in the protein. They indicated that sufficient amounts of hydrogen peroxide must be added to overcome the natural peroxidase before oxidation of annatto can be effective.

It has now been surprisingly found contrary to the teaching of McDonough et al. that the peroxidase catalyses the oxidation of annatto by hydrogen peroxide but is deactivated by high concentrations of hydrogen peroxide. Furthermore the deactivation effect has been found to depend both on the concentration of hydrogen peroxide and on the time the peroxidase is exposed to the deactivating concentration and that if the concentration of hydrogen peroxide present in the whey falls below the deactivating concentration for that whey before complete deactivation of the peroxidase has occurred decolourisation then occurs but at a slower rate.

In its broadest aspect therefore the present invention provides a method of decolourisation annattocontaining whey, or products produced therefrom, by oxidation with hydrogen peroxide, characterised in that the oxidation is carried out in the presence of a catalytic amount of an active peroxidase, in that the amount of hydrogen peroxide used is sufficient to effect the oxidation of the annatto and in that the time for which the peroxidase is exposed to a deactivating concentration of hydrogen peroxide is insufficient to permanently deactivate the peroxidase.

The peroxidase may be that inherent in the whey, namely lactoperoxidase and/or may be added to the system such as by the addition, for example, of a catalytic amount of active lactoperoxidase or an active peroxidase of similar enzymatic action such as horseradish peroxidase.

For any given whey there is an optimum amount of hydrogen peroxide which effects rapid peroxidase catalysed decolourisation of annatto in whey. Below that optimum amount of hydrogen peroxide peroxidase catalysed decolourisation of the annatto may not occur at all, or the hydrogen peroxide is exhausted soon after the catalysed oxidation of the annatto commences. As the initial concentration of hydrogen peroxide in the whey is increased, for any given whey there is an initial lag time before peroxidase catalysed decolourisation of the annatto commences. The extent of the time lag increases with increasing initial concentration of hydrogen peroxide. The rate of peroxidase catalysed decolourisation of the whey after the time lag decreases with increasing initial concentration of hydrogen peroxide in the whey.

Without wishing to be bound by any particular theory, it is believed that more than one factor is involved. The annatto is believed to act as a substrate for the peroxidase. If other substrate(s) are present in the whey they may compete preferentially for the attachment points or sites on the peroxidase and react with a part of the hydrogen peroxide. Furthermore, above a critical initial concentration of hydrogen peroxide in any given case, the peroxidase catalyst is deactivated. This is believed to be due both to inhibition of the ability of the peroxidase to act as a substrate base for annatto which is a reversible effect and to denaturing of the peroxidase which increases with time of exposure of the peroxidase to the hydrogen peroxide. If the initial concentration of hydrogen peroxide is subsequently reduced, e.g. by reaction with other substrates, or by reaction with other materials in the whey, such as catalase, then if the concentration of hydrogen peroxide in the whey falls at a sufficient rate the activity of the peroxide will in general be restored at least in part. The rate of decolourisation will then be governed by the residual activity of the peroxidase to catalyse the reaction of annatto with hydrogen peroxide which in turn will depend on the initial concentration of the hydrogen peroxide and the time for which the peroxidase has been exposed to a deactivating concentration of hydrogen peroxide. If that time is short the subsequent rate of decolourisation is high, that is to say, the activity of the peroxidase as a catalyst is not materially affected by a short exposure to an initial deactivating concentration of hydrogen peroxide. At high initial concentrations of $H_2O_2$ however, it may take some considerable time for the excess hydrogen peroxide to react with materials other than annatto in the whey and in this time, at least some of the peroxidase will be permanently deactivated.

If the initial concentration of hydrogen peroxide is so great that reactive materials in the whey are insufficient to reduce the hydrogen peroxide concentration sufficiently to allow restoration of the catalytic activity of the peroxidase then peroxidase catalysed oxidation of the annatto will not occur and decolourisation will proceed only very slowly or possibly not at all.

The concentration of hydrogen peroxide which effectively deactivates peroxidase is not a constant value but has been found to depend on the protein concentration in the whey or whey-derived product. Thus reconstituted liquid whey protein concentrates, or reconstituted whey protein concentrate powders, having high protein contents compared to the original whey, have been found to tolerate higher initial concentrations of hydrogen peroxide before effective deactivation of the peroxidase takes place.

As already stated, it is believed that the annatto acts as a substrate for the peroxidase so that if any other materials are present which also act as substrates they may compete preferentially with the annatto for the peroxidase and hydrogen peroxide. Where such materials are present the amount of hydrogen peroxide added to the whey or whey-derived product must be sufficient to accommodate both such substrate(s) and the annatto.

An example of such a preferentially competing substrate is the thiocyanate ion which is present in bovine milk. The concentration of thiocyanate ion is substantially reduced by, for example, demineralisation or ultrafiltration and prevents less or no real problem in demineralised whey or whey protein concentrates.

Increasing temperature increases the rate of peroxidase catalysed decolourisation of annatto in whey up to the temperature at which deactivation of the peroxidase takes place. In general, the temperature used will depend on the processing conditions. Thus for example, in the processing of whey to produce for example a whey protein concentrate, the point of injection of hydrogen peroxide into the whey being processed will be material in terms of the temperature which can be used. Where the whey can, as a normal practice, be held for fairly long periods, quite low temperatures of 5° to 10° C. could effectively be used. Where, because of the point of injection of the hydrogen peroxide, rapid decolourisation is necessary or required, higher temperatures would then be necessary and for the maximum rate of decolourisation a temperature of between 55° to 60° C. would be preferred. Higher temperatures might be used for very short periods, but at such higher temperatures, e.g. above 65° C. the whey could not be held at such a temperature for very long and certainly not long enough to deactivate the catalyst.

The peroxidase must be present in an active state to catalyse the oxidation of annatto by hydrogen peroxide. If ion exchange is carried out on the whey prior to decolourisation, it has been found that a catalytic amount of active peroxidase must be added to the treated whey in order to effect decolourisation. It is believed that the extremes of pH which occur in the whey during ion exchange deactivates any naturally occurring peroxidase in the whey. Demineralisation which is effected without such extremes of pH as by dialysis has not been found to affect the activity of the peroxidase catalyst. Again, drying, such as spray drying of a whey protein concentrate has also been found to deactivate naturally occurring peroxidase, and reconstituted whey protein concentrate powders require the addition of a catalytic amount of peroxidase to the reconstituted system.

The pH of the whey or whey-derived product has an effect on the rate of oxidation of the annatto and should in general be maintained in the range of from 4.5 to 7.5, preferably 5.5 to 6.3.

In a more specific embodiment the invention provides a method of decolourising whey or whey-derived products (such as whey protein concentrates) containing annatto, by oxidation of the annatto with hydrogen peroxide, characterised in that the oxidation is effected in the presence of an active peroxidase catalyst at a pH of from 4.5 to 7.5, preferably 5.5 to 6.3, and in that the amount of hydrogen peroxide used is sufficient to effect the oxidation of the annatto whether or not other materials which preferentially compete with the annatto for the hydrogen peroxide are present and in that when the initial concentration of hydrogen peroxide used is initially sufficient to deactivate the peroxidase as a catalyst said initial concentration of hydrogen peroxide is insufficient to permanently deactivate the peroxidase before the concentration of hydrogen peroxide in the whey has been reduced by reaction with materials other than annatto to below a deactivating level.

Generally the lactoperoxidase naturally present in whey is sufficient to catalyse the oxidation of the annatto provided that the whey has not previously been subjected to conditions which deactivate the lactoperoxidase, e.g. ion-exchange, high temperature or spray drying. Where deactivation of the naturally occurring lactoperoxidase has occurred, active peroxidase which can be lactoperoxidase or another peroxidase having similar enzyme activity such as horseradish peroxidase must be added to the whey or whey-derived product prior to the addition of hydrogen peroxide. Thus a reconstituted whey protein concentrate powder that has been spray dried will need such an addition of active peroxidase if decolourisation by the method of the present invention is to be effective.

In practice, where for example annatto-containing whey is to be subjected to ultrafiltration the hydrogen peroxide can conveniently be dosed in-line into the whey e.g., before entry into the bulk storage tank(s) from which the whey is later conveyed to an ultrafiltration unit. Where the whey is to be demineralised other than by ion exchange the decolourisation according to the invention is preferably effected after such demineralisation. Whey protein concentrates may be decolourised before drying to form a powder or (with addition of active peroxidase) a reconstituted whey protein concentrate powder may also be decolourised by the method of the invention.

The invention will be further illustrated by reference to the accompanying drawings in which:

FIGS. 1a to 1f are curves showing change in absorbance at 460 nm against time and illustrating the effect of hydrogen peroxide concentration on peroxidase catalysed decolourisation of pasteurised whey which has been stored for several days at 0° to 4° C.;

FIGS. 2a to 2c are curves showing the change in absorbance at 460 nm against time and illustrating the effect of hydrogen peroxide concentration on peroxidase catalysed decolourisation of fresh pasteurised whey;

FIGS. 3a to 3d are curves showing the change in absorbance at 460 nm against time and illustrating the effect of increasing concentrations of thiocyanate ion on peroxidase catalysed decolourisation of whey;

FIGS. 9 and 10 illustrate the effect of concentration by ultrafiltration on peroxidase catalysed decolourisation of whey.

Figure 1E:
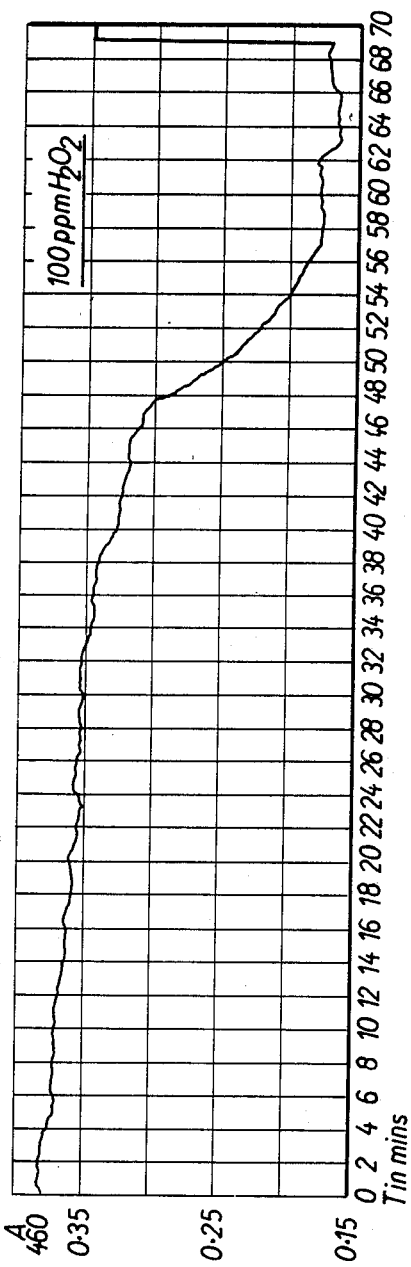
Figure 1F:
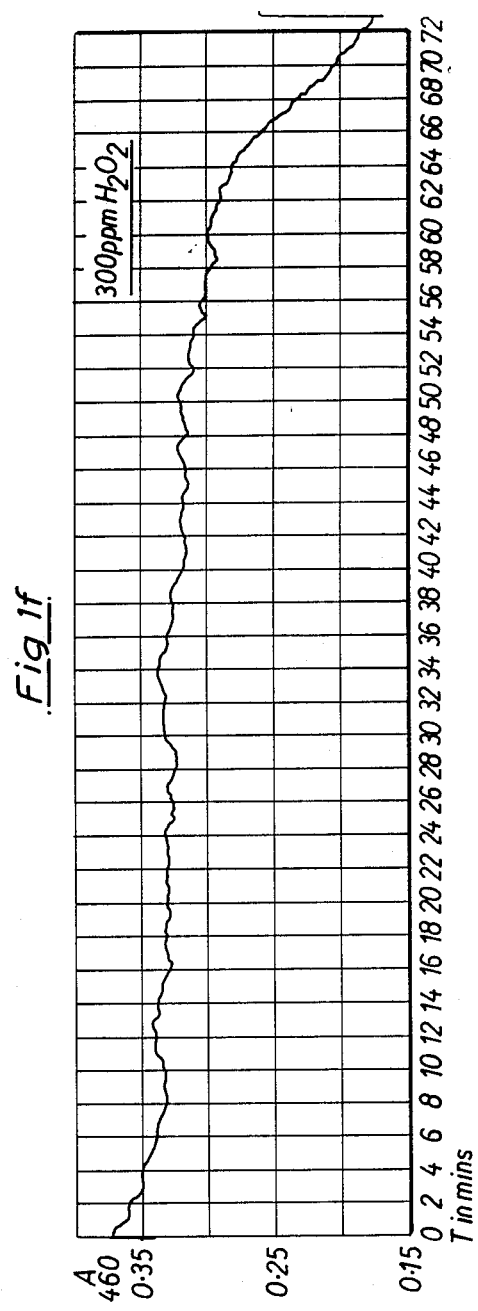

Unless otherwise stated the wheys used in producing the following figures of the drawings were commercially produced during Cheddar cheese manufacture, the whey pasteurisation conditions being either 71.5° C./17 secs or (72.2 to 72.6° C.)/18 secs. Typical analysis figures in percent by weight for liquid whey, whey powder and whey powder concentrate (75%) are as follows:

|  | Liquid Whey | Whey Powder | WPC 75 Powder |
|---|---|---|---|
| Total Solids | 6.1 | 96.0 | 96.1 |
| Protein (N × 6.38) | 0.8 | 12.1 | 76.9 |
| Fat | 0.04/0.25* | 0.8 | 6.5 |
| Ash | 0.52 | 8.0 | 2.75 |
| Sodium | 0.053 | 0.85 | 0.13 |
| Potassium | 0.15 | 2.47 | 0.49 |
| Calcium | 0.062 | 1.02 | 0.46 |
| Magnesium | 0.008 | 0.13 | 0.048 |
| Phosphorus | 0.046 | 0.79 | 0.24 |
| pH | 6.3 | 6.0 | 6.18 |

*separated/unseparated.

Whey protein concentrates (e.g. WPC 75) were produced on DDS plate and frame UF equipment and then spray dried.

Referring to FIGS. 1a to 1f, $H_2O_2$ solution was added to six separate samples of pasteurised white whey containing 1 ppm added norbixin which had been stored for several days at 0° to 4° C. and the change in absorbance at 460 nm compared to a white whey was measured against time. The $H_2O_2$ solution was added to as to provide 10 ppm, 20 ppm, 30 ppm, 50 ppm, 100 ppm and 300 ppm of $H_2O_2$ in the respective samples of the whey. The resulting curves are reproduced in FIGS. 1a to 1f. It is seen that a lag time occurs before the onset of peroxidase catalysed decolourisation, the lag time increasing with increasing initial concentration of the $H_2O_2$ in the whey. Further, it is seen that at high time lags the ensuing peroxidase catalysed decolourisation after lag time is slower. It was observed that the concentration of the $H_2O_2$ continuously decreased but more slowly during the lag time. The experiment was repeated with three samples of fresh pasteurised whey containing 1 ppm added norbixin and using 10 ppm, 30 ppm and 100 ppm initial concentration of $H_2O_2$. The results are shown in FIGS. 2a to 2c.

A comparison of FIG. 1a with FIG. 2a shows a marked similarity. At 30 ppm $H_2O_2$ however, the lag time has considerably increased from 15 minutes in FIG. 1b to 57 minutes in FIG. 2b and the ensuing peroxidase catalysed decolourisation rate is much slower. At the end of the lag time in FIG. 2b the $H_2O_2$ concentration had dropped to 4 ppm. At 100 ppm initial $H_2O_2$ concentration the time lag in FIG. 2c is extended to include the whole curve (5 hours) and no peroxidase catalysed decolourisation section of the curve is apparent. Furthermore, the rate of fall in $H_2O_2$ concentration over the whole of this curve was observed to be very slow, the $H_2O_2$ concentration after 2 hours being still 25 ppm, after 3 hours 10 ppm and after 4 hours 5 ppm.

From the results set out in FIGS. 1 and 2 it is seen that an initial concentration of $H_2O_2$ above about 10 ppm deactivates the peroxidase catalyst but that partial reactivation occurs if the $H_2O_2$ concentration in the whey is reduced below about 10 before all the peroxidase has been permanently deactivated. It is believed that the higher rate of fall of $H_2O_2$ concentration in the stored whey is probably due to reaction of the $H_2O_2$ with catalase formed during storage of the whey.

Figure 3B:
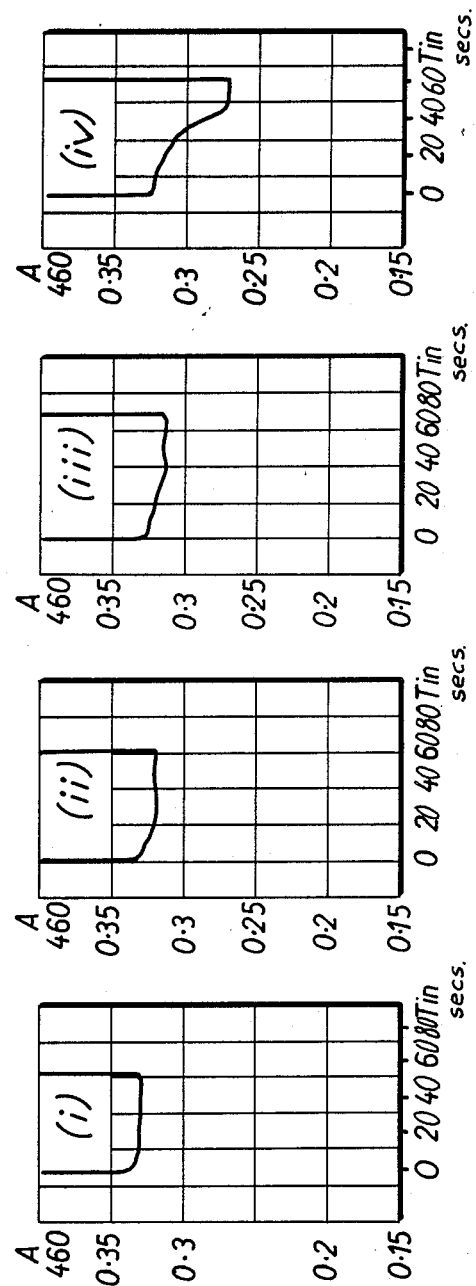
Figure 3C:
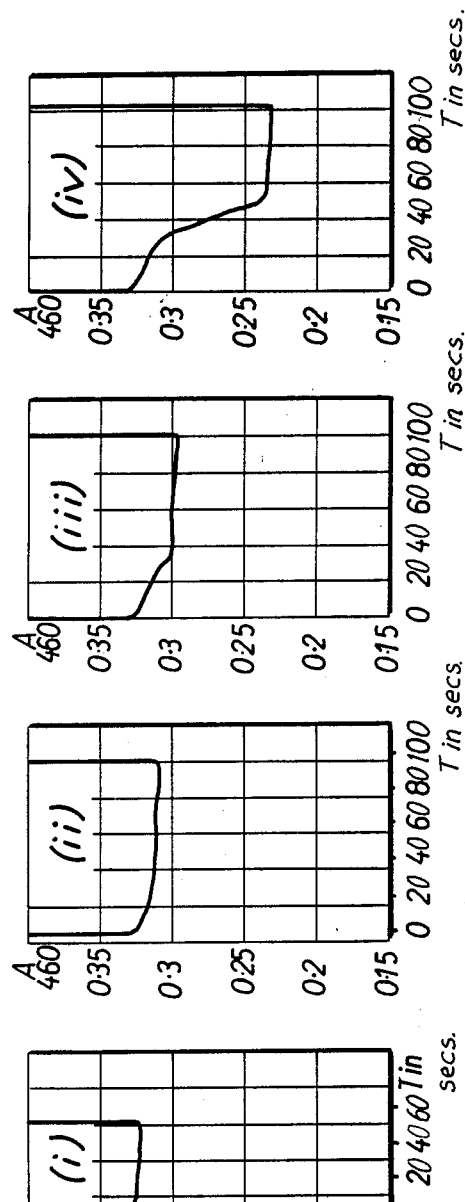
Figure 3D:
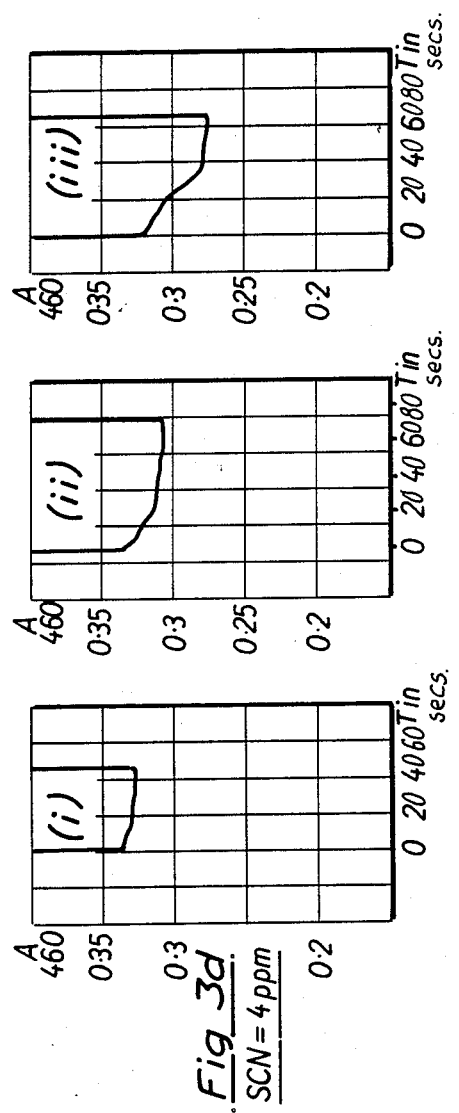

The effect of thiocyanate concentration is illustrated in FIGS. 3a to 3d. The control samples were fresh white pasteurised whey with 1 ppm added norbixin. Two control samples were used with initial $H_2O_2$ concentrations of 7 ppm and 8 ppm $H_2O_2$ respectively. The resulting curves produced as for FIGS. 1 and 2 are set out as FIG. 3a (i) and (ii). The experiment was repeated using four samples containing 1 ppm added norbixin and 1 ppm added thiocyanate ion (added as sodium thiocyanate), 7 ppm, 8 ppm 9 ppm and 10 ppm $H_2O_2$ respectively initially added to the four samples. The results are shown in FIG. 3b (i), (ii), (iii) and (iv). The experiment was repeated with four further samples containing 1 ppm added norbixin and 2 ppm added thiocyanate ion but using respectively 10 ppm, 11 ppm, 12 ppm and 13 ppm $H_2O_2$. The results are shown in FIG. 3c (i), (ii), (iii) and (iv). A final experiment was carried out using three samples of the same whey with 1 ppm added norbixin and 4 ppm added thiocyanate ion using 13 ppm, 16 ppm and 17 ppm $H_2O_2$ in the respective samples. The resulting change in absorbance at 460 nm with time is shown in FIG. 3d (i), (ii) and (iii).

The curves in FIGS. 3a to 3d show that with increasing concentration of thiocyanate in the whey higher initial concentrations of $H_2O_2$ are required to effect peroxidase catalysed decolourisation of the whey. It is believed that the thiocyanate in whey competes preferentially for substrate sites on the peroxidase and is oxidised first by the hydrogen peroxide present. Thus enough hydrogen peroxide needs to be added to react with both the thiocyanate and with the norbixin. The control samples contained thiocyanate ions and exhibit the same effect. The time lag before onset of decolourisation is here being caused by the thiocyanate ion independently of lag time due to the initial $H_2O_2$ being at a deactivating level.

Figure 4A:
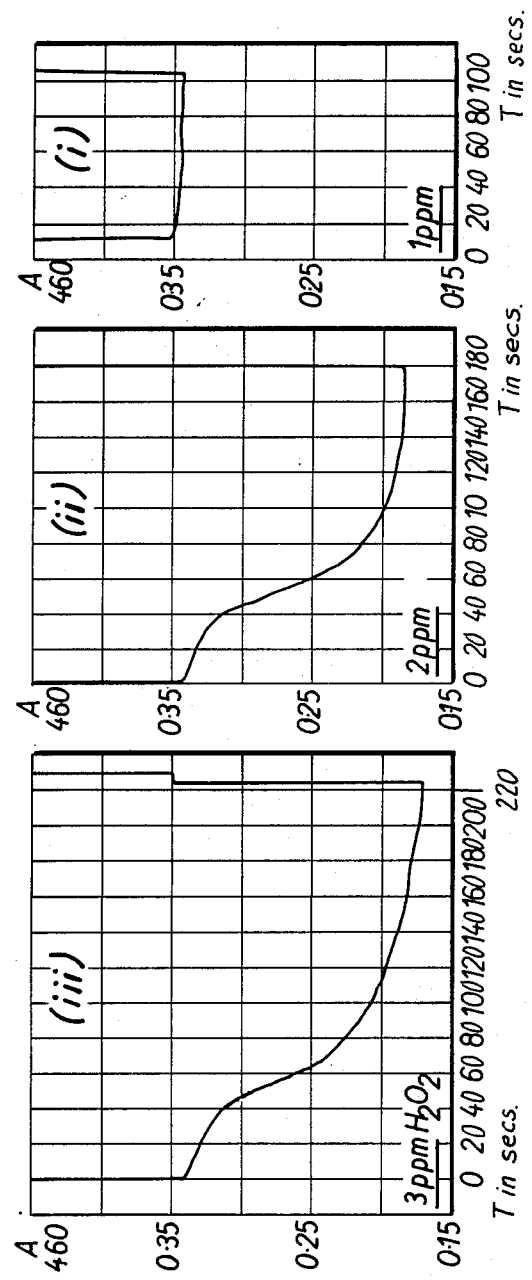
FIGS. 4a and 4b are curves showing the change in absorbance of 460 nm against time and illustrating the effect of demineralisation on peroxidase catalysed decolourisation of whey.
Figure 4B:
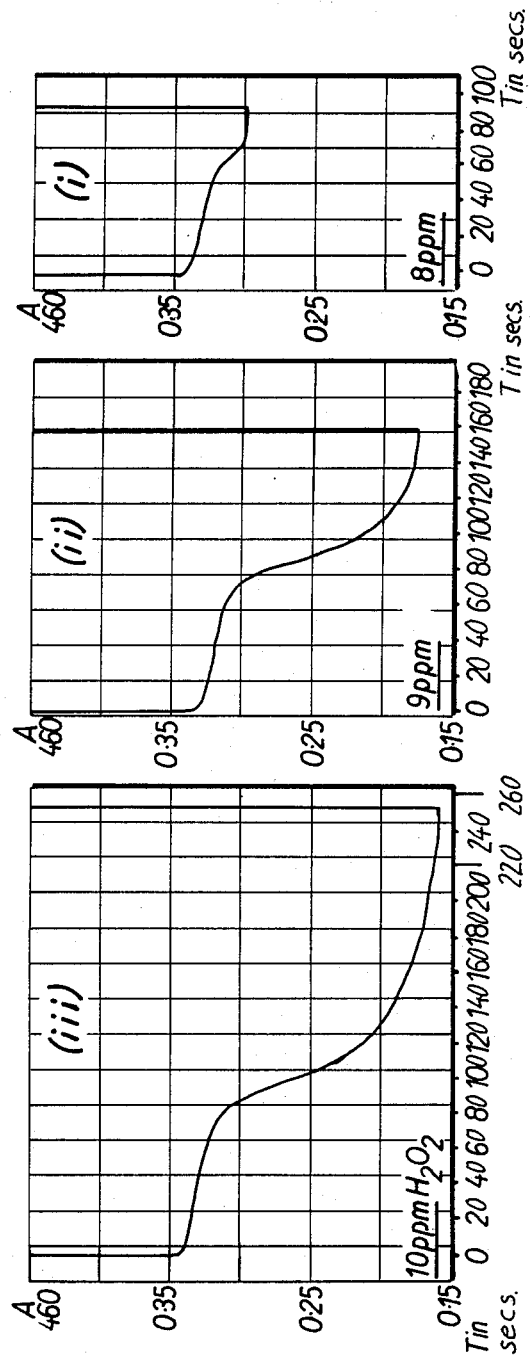

FIGS. 4a (i), (ii) and (iii) and FIGS. 4b (i), (ii) and (iii) illustrate the effect of demineralisation of dialysis on the decolourisation of fresh whey. The demineralised whey was produced by dialysis of fresh pasteurised white whey for 2.5 hours against deionised water 77 ml whey/1500 ml water. The final volume of the dialysed whey was 85 ml. A control sample of whey was diluted with deionised water in the proportion 77 ml whey to 8 ml deionised water. 1 ppm norbixin was added to each of three samples of control whey and three samples of the dialysed whey. All samples were then subjected to the peroxidase catalysed decolourisation process of the invention, 1 ppm, 2 ppm and 3 ppm $H_2O_2$ being added respectively to the dialysis samples and 8 ppm, 9 ppm and 10 ppm $H_2O_2$ to the control samples. The change in absorbance at 460 nm was plotted against time in each case and the results are set out in FIGS. 4a (i), (ii) and (iii) for dialysed whey and in FIGS. 4b (i), (ii) and (iii) for the control samples. It is immediately apparent that the reduction in mineral content has a marked effect on the amount of $H_2O_2$ required to effect peroxidase catalysed decolourisation of the whey, about 2 ppm to 3 ppm being required for the dialysed samples whereas 9 ppm to 10 ppm $H_2O_2$ were required for the control samples. The lag time in FIGS. 4a (ii) and (iii) is also shorter than for FIGS. 4b (ii) and (iii). Taken in conjunction with the results shown in FIGS. 3a and 3b it is reasonably apparent that the reduction in thiocyanate ion by dialysis effectively reduces the lag time and the amount of $H_2O_2$ required for decolourisation.

Figure 5:
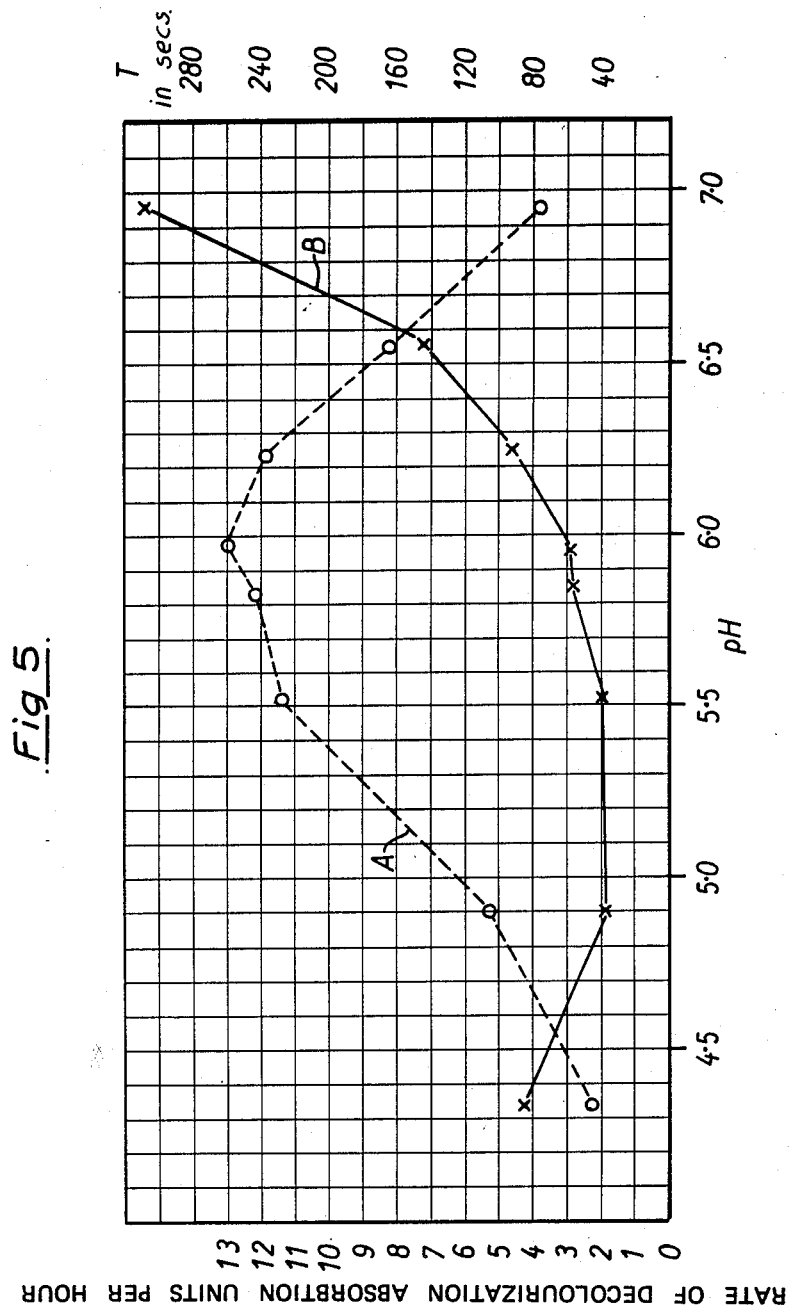
FIG. 5 shows two curves, curve A illustrating the effect of pH on the rate of peroxidase catalysed decolourisation of whey and curve B the effect of pH on lag time before onset of peroxidase catalysed decolourisation of the whey commences.

The effect of pH on rate of decolourisation and on the lag time is illustrated in FIG. 5. Eight samples of a fresh Red Leicester cheese whey were used and the decolourisation was effected in each sample with 10 ppm $H_2O_2$ at various pH levels and the rate of colour loss in absorbance units per hour was plotted against pH to obtain curve A and lag time in minutes against pH to obtain curve B. From curve A it is apparent that whilst a range of pH of from about 4.5 to about 7.5 is possible, a range of about 5.5 to about 6.3 would be preferable. The lag time has a different optimum range of about 4.5 to about 6.

Figure 6B:
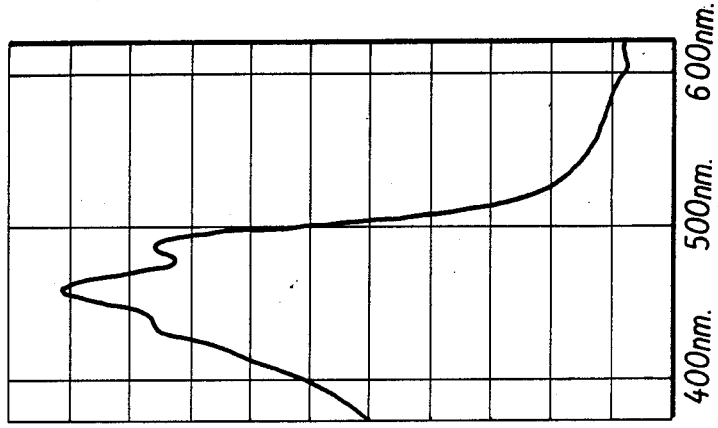
FIGS. 6a to 6d illustrate the absorption characteristics of annatto.
Figure 6A:
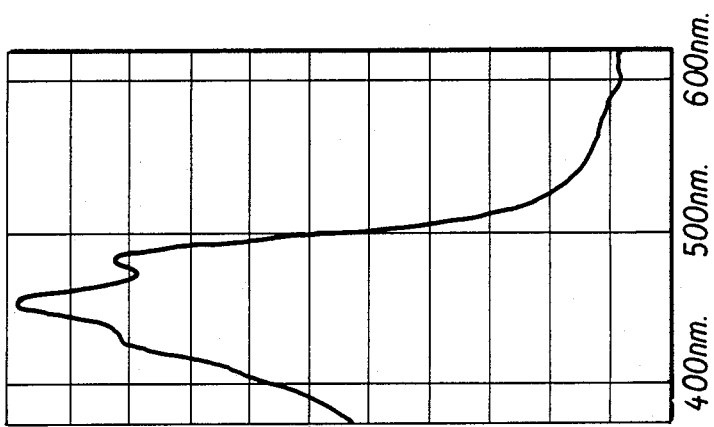
Figure 6D:
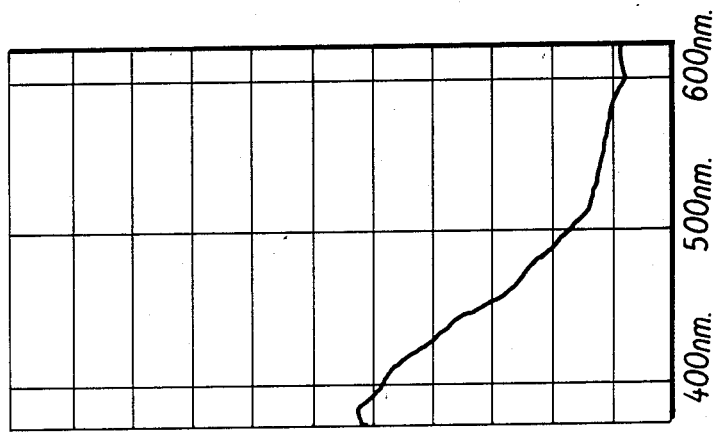
Figure 6C:
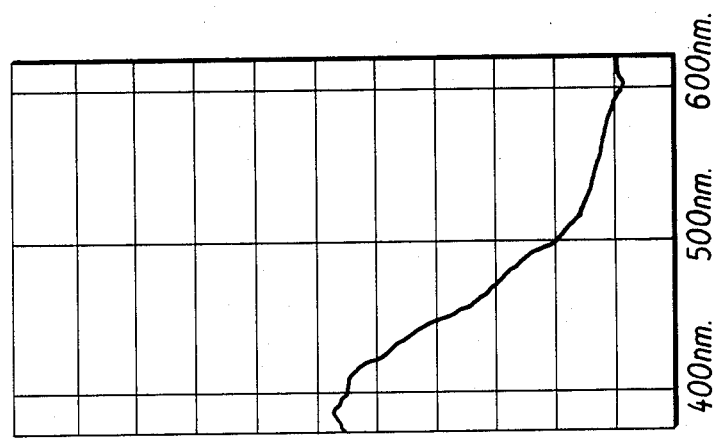

The absorbance curve for annatto is reproduced in FIGS. 6a to 6d. In FIG. 6a the absorbance curve of 200 ppm annatto (1 ppm norbixin) in distilled water is reproduced. It is seen that the peak absorbance occurs at 460 nm which is the wavelength chosen in producing the absorption curves in the remainder of the accompanying drawings. It is to be noted that there is very little absorbance at 600 nm. FIG. 6b is a repeat of FIG. 6a but with 0.1% v/v Boehringer lactoperoxidase added. In FIG. 6c 1.0 ppm $H_2O_2$ has also been added and the curve shows a marked drop in absorbance at 460 nm. To produce the curve 6d lactoperoxidase (0.1% v/v) was added to the reference solution and FIG. 6d shows that this addition does not alter the curve shown by FIG. 6c for which the reference solution was distilled water. In all four curves 6a to 6d the absorbance at 600 nm remains constant at a low level. The change in visible colour of the aqueous system apparent to the eye in moving from curve 6b 6 to 6c is that of from a strong yellow to a very pale yellow. In producing the three curves 6a to 6c the reference used was distilled water. In all four curves 6a to 6d the pH was 6.2, the scan speed was 2 nm/sec, chart speed 20 sec/cm, the expansion 40 nm/cm, the absorbance range 0 to 0.5 and path length 10 mm.

Figure 7:
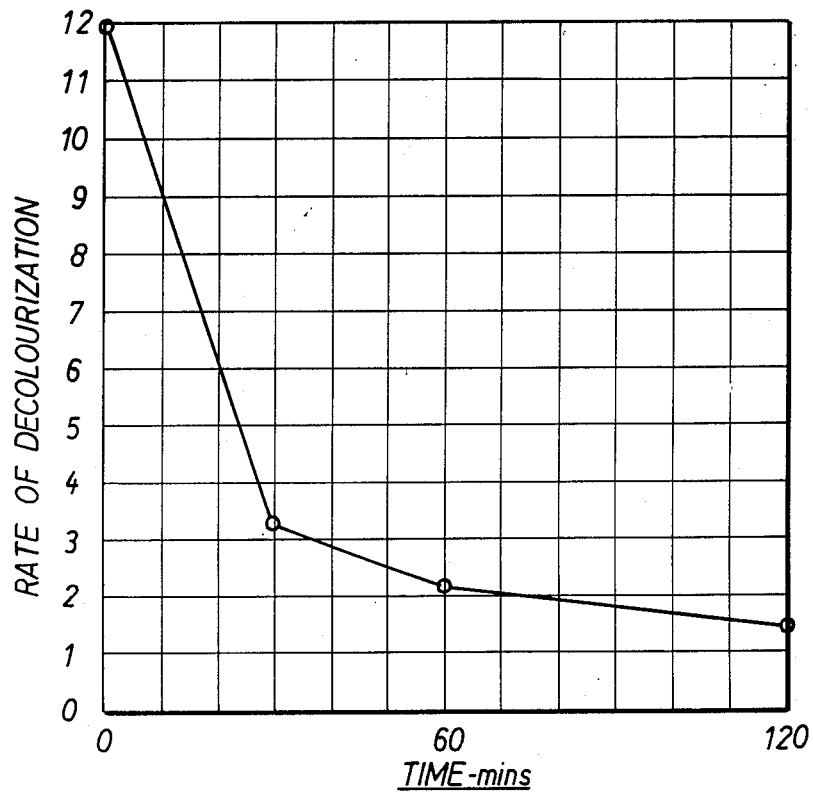
FIGS. 7 and 8 illustrate the deactivating effect of higher concentrations of hydrogen peroxide on peroxidase.
Figure 8:
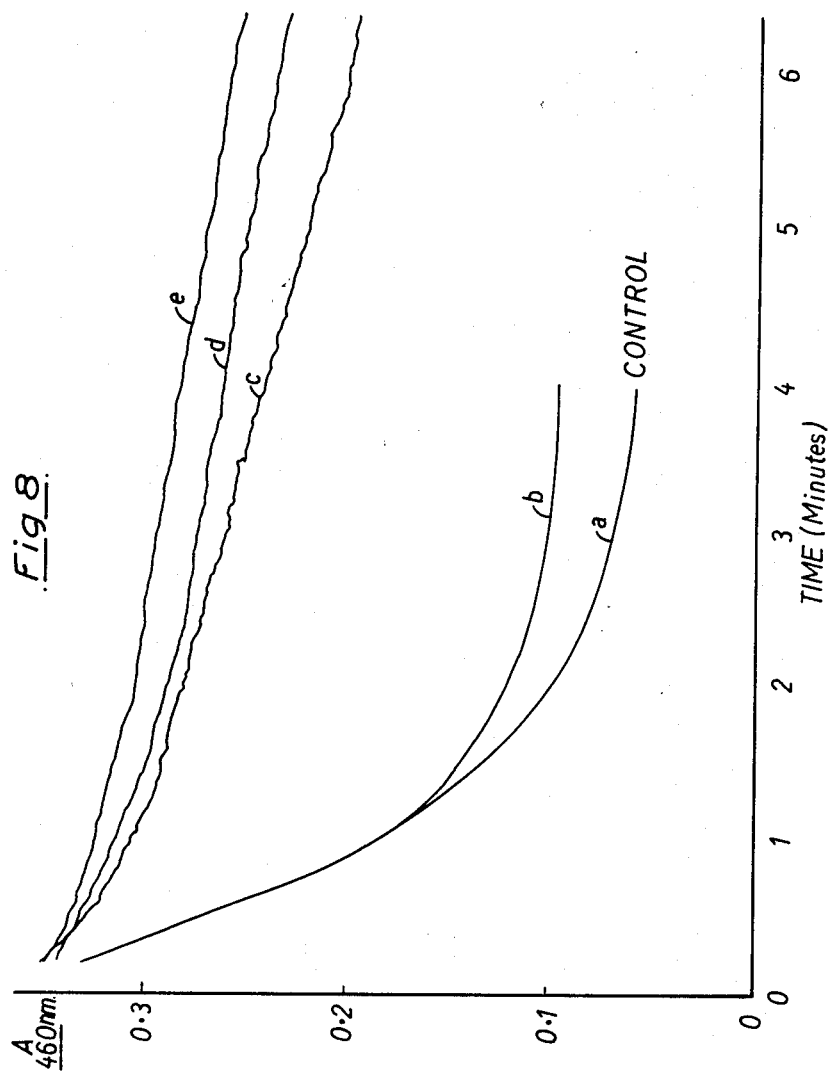

The activation of peroxidase by hydrogen peroxide is illustrated in FIGS. 7 and 8. To produce the curves reproduced in FIGS. 7 and 8, 5 μl of purified lactoperoxidase (Boehringer) were added to each of five tubes containing 5 ml of approximately 20 mM potassium phosphate buffer having a pH of 6.2. $H_2O_2$ was then added to five of the tubes to give a concentration of $H_2O_2$ of 10 ppm. Beads of agar-entrapped yeast cells containing high catalase activity were added to one of the tubes immediately after addition of the $H_2O_2$. Beads of the same agar-entrapped yeast were added to a second tube 30 minutes after addition of the hydrogen peroxide and to the third and fourth tubes 60 minutes and 120 minutes respectively after addition of the hydrogen peroxide. The purpose of these additions was to react the catalase with $H_2O_2$ to eliminate it from the system in each of the four tubes to which $H_2O_2$ had been added. The catalase took about 25 to 30 minutes to eliminate the $H_2O_2$ in each case.

3 ml samples of liquid (separated from the beads in four of the tubes) were taken from each of the five tubes and 20 μl of Fulwoods annatto were added to each 3 ml sample followed by $H_2O_2$ to give a concentration of 1 ppm $H_2O_2$ in each 3 ml sample. Absorption curves at 460 nm were made in respect of each sample and the rate of decolourisation in absorbance units per hour determined from the resulting curves. In FIG. 7 the values for rate of decolourisation are plotted against the time in minutes after addition of $H_2O_2$ when the beads were added. No difference was found in the rate of decolourisation as between the 3 ml sample taken from the tube to which 100 ppm $H_2O_2$ had not been added and the 3 ml sample taken from the tube to which the beads were added immediately after the 100 ppm $H_2O_2$. In each of the remaining 3 ml samples the rates of decolourisation had dropped considerably and were lower the longer the time interval between addition of the 100 ppm $H_2O_2$ and the addition of the beads. The absorption curves are reproduced in FIG. 8 as curves (a) to (e), curve (a) being the control sample to which neither 10 ppm $H_2O_2$ nor beads were added and curves (b), (c), (d) and (e) are the samples to which 100 ppm $H_2O_2$ were added followed by the beads at intervals of 0, 30, 60 and 120 minutes, respectively.

Figure 9:
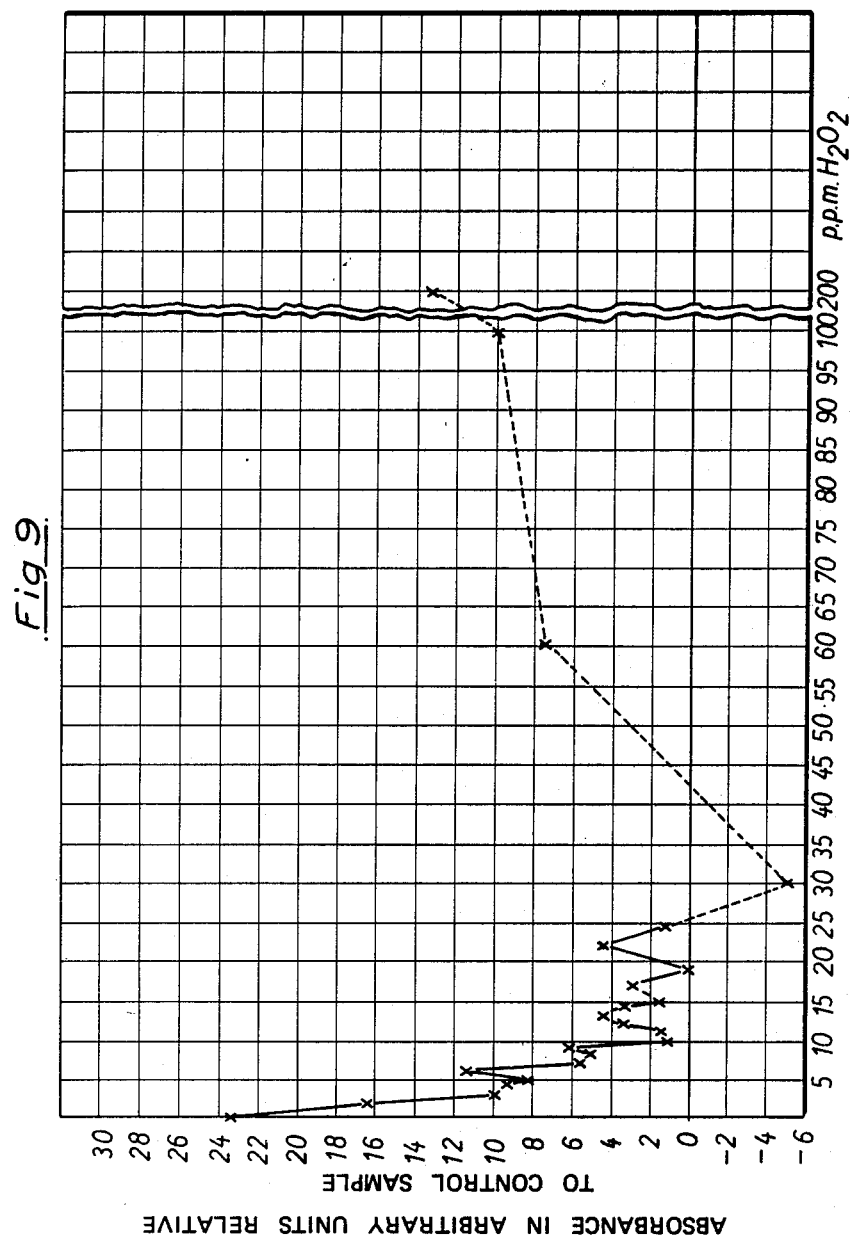

The effect of concentration by ultrafiltration on peroxidase catalysed decolourisation of whey is illustrated in FIGS. 9 and 10. Whey protein concentrates WPC1 and WPC2 having the following analysis were used:

|  | WPC1 (FIG. 9) | WPC2 (FIG. 10) |
|---|---|---|
| Total Solids | 9.5 | 22.2 |
| Protein (N × 6.38) | 3.63 | 15.2 |
| Fat | 0.3 | 1.37 |
| Ash | 0.73 | 0.94 |
| pH | 6.15 | 6.15 |

WPC1 had a concentration factor (CF) of 5 and WPC2 a CF of 15. To a sample of WPC1, 19 ppm $H_2O_2$ were added. The $H_2O_2$ treated material was stored for 2 days in a refrigerator. The absorption at 460 nm of a sample diluted 5-fold was measured and taken as the reference for the zero point. Various concentrations of $H_2O_2$ were added to further samples of WPC1, the treated materials stored in a refrigerator for 2 days and the absorption of 5-fold diluted samples measured as against the reference sample. The results are shown in FIG. 9 in graphical form, the absorbance in arbitrary units relative to the reference being plotted against the initial concentration of $H_2O_2$ added in each sample in ppm. Since WPC1 had a protein content of 3.63% as opposed to about 0.8% in the original whey, the amount of annatto (associated with the protein) to be decolourised was considerably higher in WPC1 than in whey. Consequently the amount of $H_2O_2$ required also increased. The higher initial concentrations of 50, 100 and 200 ppm $H_2O_2$ showed a deactivating effect but it is seen that initial concentrations of as high as 40 ppm did not in this instance cause much, if any, deactivation of the peroxidase. A similar series of measurements was conducted with samples of WPC2 except that since the CF of WPC2 was 15 the dilution prior to spectrophotometry was 15-fold and the control reference had 30 ppm $H_2O_2$ added. The protein concentration in WPC2 was 15.2%. From FIG. 10, toleration of the peroxidase to $H_2O_2$ concentration is seen to have increased to about 50 ppm in this series of samples. The residual $H_2O_2$ concentration of the sample marked A in FIG. 10 was zero after 4 minutes, and in the case of the samples marked B and C in FIG. 10 was zero after 5 minutes and 0.5 ppm after 9 minutes respectively.

The invention will be further illustrated by reference to the following Examples which are purely illustrative.

EXAMPLE 1

Figure 11:
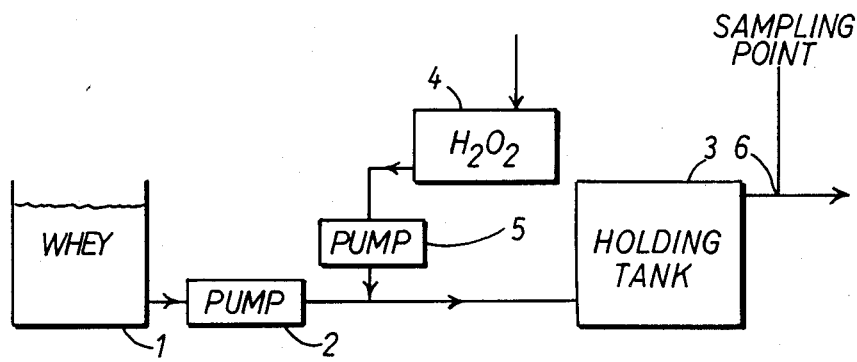
FIG. 11 is a block flow diagram illustrating continuous peroxidase catalysed whey decolourisation by hydrogen peroxide on a laboratory scale.

A laboratory scale continuous whey treatment is illustrated in FIG. 11. The whey used was fresh pasteurised white whey from commercial Cheddar Cheese (white) with 1 ppm added norbixin. The whey at 40° C. was pumped from a supply tank 1 via pump 2 to holding tank 3, entering the bottom of tank 3 and exiting from the top thereof. Hydrogen peroxide held in supply tank 4 was pumped via pump 5 into the whey stream between pump 2 and holding tank 3 to provide 9 ppm $H_2O_2$ in the whey. 9 ppm $H_2O_2$ was just sufficient to effect decolourisation of a small sample of the whey as a batch addition. The flow rate of whey was such as to fill holding tank 3 in 34 minutes and the flow was maintained at this level throughout the experiment. Samples of whey were taken at sampling point 6 at regular time intervals from commencement of whey flow and the absorbance at 460 nm measured for each sample together with residual $H_2O_2$ (if any). The results are shown in Table I.

TABLE I

| Time (Mins) | Absorption (460 nm) | Residual $H_2O_2$ (ppm) |
|---|---|---|
| 34 | 0.14 | 0–0.5 |
| 54 | 0.105 | 0–0.5 |
| 79 | 0.095 | 0 |
| 99 | 0.105 | 0 |
| 131 | 0.13 | 0 |
| 145 | 0.15 | 0 |
| 152 | 0.12 | 0 |
| 174 | 0.12 | 0 |
| 190 | 0.122 | 0.1 |
| 219 | 0.125 | 0.2 |
| 260 | 0.13 | 0.1 |
| 280 | 0.128 | 0.1 |
| (Untreated Whey) | (0.36) | — |

From Table I it is seen that reduction of whey colour to very low levels can be achieved on a continuous basis by quite small continuous in-line addition of $H_2O_2$.

EXAMPLE 2

The procedure of Example 1 was repeated using the same whey except that the $H_2O_2$ was added to provide an initial concentration of 7 ppm $H_2O_2$ in the whey i.e. insufficient to effect decolourisation of a sample of the whey by batchwise additon (cf Example 1). The results are shown in Table II.

TABLE II

| Time (Mins) | Absorption (460 nm) | Residual $H_2O_2$ (ppm) |
|---|---|---|
| (Untreated Whey) | 0.4 | — |
| 44 | 0.175 | 0 |
| 64 | 0.175 | 0 |
| 74 | 0.175 | 0 |
| 84 | 0.175 | 0 |

EXAMPLE 3

Example 1 was repeated using the same whey as in Example 2 but increasing the $H_2O_2$ addition to an initial level of 11 ppm. It was found that build-up of $H_2O_2$ with time occurred in the holding tank at this higher level of $H_2O_2$ addition which was reflected in the decolourisation achieved when the build-up occurred. The results are set out in Table III.

TABLE III

| Time (Mins) | Absorption (460 nm) | Residual $H_2O_2$ (ppm) |
|---|---|---|
| 44 | 0.18 | 0 |
| 54 | 0.185 | 0.5 |
| 74 | 0.21 | 0.5 |
| 84 | 0.21 | 0.8–1.0 |
| 97 | 0.22 | 0.5 |
| 108 | 0.28 | 0.5 |
| 118 | 0.315 | 0.5–0.8 |

EXAMPLE 4

In this Example hydrogen peroxide was injected into Red Leicester whey being processed in a full-scale commercial plant for the production of whey powder by evaporation and drying. The hydrogen peroxide was injected at a rate to provide 11 ppm $H_2O_2$ in the whey, the injection point being into the whey after pasteurisation but before the whey reached the storage silos in which the whey was held for a minimum of 1 hour prior to evaporation and drying. Pasteurisation was effected at 71.5° C./17 secs. The temperature of the whey during injection and in the storage silos was 42° C. A decolourisation of 60% was achieved.

EXAMPLE 5

The procedure of Example 4 was carried out on a different Red Leicester whey and it was found that 15 ppm $H_2O_2$ injection into this whey achieved about the same degree of decolourisation as in Example 4, namely 60%. It is believed the higher concentration of $H_2O_2$ required (15 ppm as opposed to 11 ppm in Example 4) was due to there being a higher concentration of thiocyanate concentration in this whey compared to that in Example 4.

EXAMPLE 6

The procedure of Example 4 was repeated in a commercial plant producing whey powder arising from coloured Cheddar cheese except that the $H_2O_2$ was added to provide an initial concentration of 6 ppm $H_2O_2$ in the whey. The degree of colour removal was 50% to 60%.

EXAMPLE 7

The procedure of Example 6 was followed but on a different coloured Cheddar cheese whey and it was found necessary to inject 15 ppm $H_2O_2$ into this whey to achieve about the same decolourisation as that achieved in Example 6, namely 50% to 60%. Again, it is believed that a higher concentration of thiocyanate ion in the whey of this Example made it necessary to use the higher concentration of 15 ppm $H_2O_2$.

EXAMPLE 8

The procedure of Example 7 was repeated except that the concentration of $H_2O_2$ was 14 ppm and the point of injection of the $H_2O_2$ was into the whey stream feeding the whey evaporator. The reaction time was 4 minutes, the whey temperature increased from 20° to 71° C. during the reaction time and the decolourisation was 85%.

EXAMPLE 9

Hydrogen peroxide was injected into unseparated whey in a commercial plant producing a 75% whey protein concentrate from coloured Cheddar cheese whey. The $H_2O_2$ was added to provide an initial concentration of $H_2O_2$ in the whey of 10 ppm. The colour value of the resulting powders as measured by a Colorguard 1000 Series Colorimeter made by Pacific Scientific together with that for a WPC 75 from white Cheddar whey and the untreated coloured Cheddar whey are as follows:

| | |
|---|---|
| White Cheddar Whey Concentrate Powder | 12.1 |
| Coloured Cheddar Whey Concentrate Powder | 28.5 |
| $H_2O_2$-Treated Coloured Cheddar Whey Concentrate Powder | 16.2 |

We claim:

1. A method of decolorizing annatto-containing whey or annatto-containing products derived from whey by an enzyme catalyzed oxidation reaction with hydrogen peroxide, comprising oxidizing said annatto with hydrogen peroxide in the presence of a catalytic amount of an active peroxidase, said peroxidase being present throughout the entire oxidation of the annatto, in which the amount of hydrogen peroxide used is sufficient to effect the oxidation of at least some of the annatto present in the whey or whey derived product in order to obtain the desired decolorizing and which amount is dependent upon the protein concentration in the whey with increased quantities of protein permitting higher amounts of hydrogen peroxide to be used and in which any deactivating amount of hydrogen peroxide initially present is removed by reaction with other materials in the whey leaving an adequate amount to do the decolorizing.

2. The method according to claim 1 wherein the amount of hydrogen peroxide used is up to 200 parts per million.

3. The method according to claim 1 wherein the amount of hydrogen peroxide used is up to 100 parts per million.

4. A method as claimed in claim 1 in which oxidizing with hydrogen peroxide is effected at a pH of from 4.5 to 7.5.

5. A method as claimed in claim 4, in which oxidizing with hydrogen peroxide is effected at a pH of from 5.5 to 6.3.

6. A method as claimed in claim 1 wherein the temperature at which decolorizing is effected is not greater than 75° C.

7. A method as claimed in claim 1 further comprising treating the whey by ultrafiltration before addition of hydrogen peroxide to produce a whey concentrate.

8. A method as claimed in claim 7 in which the initial concentration of hydrogen peroxide is not greater than 100 parts per million.

9. A method as claimed in claim 7 in which the concentration factor of the concentrate is at least 5 and the initial concentration of hydrogen peroxide is not more than 40 parts per million.

10. A method as claimed in claim 7 in which the concentration factor of the concentrate is at least 15 and the initial concentration of hydrogen peroxide is not more than 50 parts per million.

11. A method as claimed in claim 1 in which the whey that is decolorized is fresh whey and the initial concentration of the hydrogen peroxide is not more than 30 parts per million.

12. A method as claimed in claim 1 further comprising storing the whey which is to be decolorized for 2 or more days before addition of hydrogen peroxide and in which the initial concentration of hydrogen peroxide is not more than 100 parts per million.

13. A method as claimed in claim 1 further comprising pasteurizing the whey before addition of hydrogen peroxide.

14. A method as claimed in claim 1 further comprising separating the residual milk fat from the whey before addition of hydrogen peroxide.

15. A method as claimed in claim 1 further comprising dialyzing the whey before addition of hydrogen peroxide.

16. A method as claimed in claim 15 in which the initial concentration of hydrogen peroxide is not greater than 10 parts per million.

17. A method as claimed in claim 1 in which the active peroxidase catalyst comprises lactoperoxidase which is naturally occurring in the whey.

18. A method as claimed in claim 1 in which the active peroxidase catalyst comprises an active peroxidase added to the whey or whey derived product to be decolorized.

19. A method as claimed in claim 18 in which the added peroxidase is a horseradish peroxidase.

20. A method of decolorizing annatto-containing whey or annatto-containing whey products derived from whey by an enzyme catalyzed oxidation reaction with hydrogen peroxide, comprising oxidizing said annatto with hydrogen peroxide in the presence of a catalytic amount of an active peroxidase wherein said active peroxidase is present throughout the entire oxidation of said annatto, in which the amount of hydrogen peroxide used is up to 200 ppm and is sufficient to effect the oxidation of at least some of the annatto present in the whey or whey derived product in order to obtain the desired decolorizing and which amount is dependent upon the protein concentration in the whey with increased quantities of protein permitting higher amounts of hydrogen peroxide to be used and in which any deactivating amount of hydrogen peroxide initially present is removed by reaction with other materials in the whey leaving an adequate amount to do the decolorizing.

21. A method of decolorizing annatto-containing whey or annatto-containing whey products derived from whey by enzyme catalyzed oxidation reaction with hydrogen peroxide, comprising oxidizing said annatto with hydrogen peroxide in the presence of a catalytic amount of an active peroxidase wherein said active peroxidase is present throughout the entire oxidation of said annatto, in which the amount of hydrogen peroxide used is up to 100 ppm and is sufficient to effect the oxidation of at least some of the annatto present in the whey or whey derived product in order to obtain the desired decolorizing and which amount is dependent upon the protein concentration in the whey with increased quantities of protein permitting higher amounts of hydrogen peroxide to be used and in which any deactivating amount of hydrogen peroxide initially present is removed by reaction with other materials in the whey leaving an adequate amount to do the decolorizing.

22. A method according to claim 21 comprising oxidizing the annatto with hydrogen peroxide in the presence of a catalytic amount of an active peroxidase at a pH of from 4.5 to 7.5 and at a temperature below 75° C.

* * * * *